US009667615B2

United States Patent
Ando et al.

(10) Patent No.: US 9,667,615 B2
(45) Date of Patent: May 30, 2017

(54) IN-VEHICLE COMMUNICATION SYSTEM

(71) Applicant: Renesas Electronics Corporation, Kawasaki-shi, Kanagawa (JP)

(72) Inventors: Eriko Ando, Tokyo (JP); Takashi Kawauchi, Kanagawa (JP); Toru Owada, Kanagawa (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 156 days.

(21) Appl. No.: 14/052,684

(22) Filed: Oct. 11, 2013

(65) Prior Publication Data

US 2014/0108787 A1    Apr. 17, 2014

(30) Foreign Application Priority Data

Oct. 12, 2012    (JP) .................................. 2012-226792

(51) Int. Cl.
*H04L 29/06*    (2006.01)
*H04L 9/32*    (2006.01)

(52) U.S. Cl.
CPC ........ *H04L 63/0823* (2013.01); *H04L 9/3263* (2013.01); *H04L 2209/84* (2013.01)

(58) Field of Classification Search
CPC ............ H04L 9/00; H04L 9/32–9/3297; H04L 63/04–63/0892
USPC ......... 713/168–176, 182–186, 202; 709/206, 709/225, 229, 389; 726/2–8
See application file for complete search history.

(56) References Cited

U.S. PATENT DOCUMENTS

| | | | |
|---|---|---|---|
| 7,558,952 B2 | 7/2009 | Kumagai et al. | |
| 7,831,831 B2 | 11/2010 | Ohmori et al. | |
| 2005/0226424 A1* | 10/2005 | Takata | H04L 63/062 380/279 |

(Continued)

FOREIGN PATENT DOCUMENTS

| | | |
|---|---|---|
| JP | 2004-032706 A | 1/2004 |
| JP | 2006-191695 A | 7/2006 |

(Continued)

OTHER PUBLICATIONS

Aslam, Baber, et al., "Distributed certificate and application architecture for VANETs", Military Communications Conference, 2009; MILCOM 2009; IEEE; IEEE, Piscataway, NJ, USA; Oct. 18, 2009, pp. 1-7.

(Continued)

*Primary Examiner* — Linglan Edwards
*Assistant Examiner* — Quazi Farooqui
(74) *Attorney, Agent, or Firm* — Shapiro, Gabor and Rosenberger, PLLC

(57) ABSTRACT

The present invention is directed to solve a problem that time is required for a process related to verification of a public key certificate of a message sender. An in-vehicle device mounted on a vehicle has a memory for holding information of a device which failed in verification of a public key certificate. At the time of performing communication between vehicles or between a vehicle and a roadside device, a check is made to see whether or not information of a device included in a message transmitted matches information of a device which failed and held in the memory. When the information matches, verification of a public key certificate is not performed.

8 Claims, 12 Drawing Sheets

(56) References Cited

U.S. PATENT DOCUMENTS

| | | | |
|---|---|---|---|
| 2006/0095388 A1* | 5/2006 | Brown | G06Q 20/0855 |
| | | | 705/67 |
| 2008/0235509 A1 | 9/2008 | Laberteau et al. | |
| 2008/0260156 A1* | 10/2008 | Baba et al. | 380/277 |
| 2011/0161660 A1* | 6/2011 | Zhang et al. | 713/156 |
| 2012/0034876 A1* | 2/2012 | Nakamura | H04L 9/321 |
| | | | 455/66.1 |
| 2013/0138952 A1* | 5/2013 | Berggren | 713/156 |
| 2013/0346744 A1* | 12/2013 | Dixon | H04L 9/3247 |
| | | | 713/156 |

FOREIGN PATENT DOCUMENTS

| | | |
|---|---|---|
| JP | 2007-088737 A | 4/2007 |
| JP | 2008-060809 A | 3/2008 |
| JP | 2009-081524 A | 4/2009 |
| JP | 2012-037940 A | 2/2012 |

OTHER PUBLICATIONS

Sander, Oliver, et al., "Design of a Vehicle-to-Vehicle communication system on reconfigurable hardware", Field-Programmable Technology, 2009; FPT 2009; International Conference on, IEEE, Piscataway, NJ, USA; Dec. 9, 2009; pp. 14-21.

Extended European search report dated Jan. 31, 2014, in European Patent Application No. 13187748.2.

Office Action, issued May 12, 2016, in Japanese Application No. 2012-226792.

* cited by examiner

FIG. 4A
261

| DEVICE ID | PUBLIC KEY | VERIFICATION RESULT VALID TIME |
|---|---|---|
| OBU_A | KobuC | 11/27/2011 10:10:10.100 |
| OBU_B | KobuD | 11/27/2011 10:10:11.100 |
| RSU_A | KrsuC | 11/27/2011 10:10:10.100 |
| ... | ... | ... |

| DEVICE ID | PUBLIC KEY | SIGNATURE OF PUBLIC KEY CERTIFICATE | VERIFICATION RESULT VALID TIME |
|---|---|---|---|
| OBU_C | $K_{obu}C$ | $S_{obu}C$ | 11/27/2011 10:10:10.100 |
| OBU_D | $K_{obu}D$ | $S_{obu}D$ | 11/27/2011 10:10:11.100 |
| RSU_C | $K_{rsu}C$ | $S_{rsu}C$ | 11/27/2011 10:10:11.100 |
| ... | ... | ... | ... |

| CERTIFICATE AUTHORITY ID | PUBLIC KEY | VERIFICATION RESULT VALID TIME |
|---|---|---|
| CA_A1 | KcaC1 | 11/27/2011 10:10:10.100 |
| CA_B2 | KcaC2 | 11/27/2011 10:10:11.100 |
| CA_A2 | KcaC2 | 11/27/2011 10:10:10.100 |
| ... | ... | ... |

FIG. 5B
264

| CERTIFICATE AUTHORITY ID | PUBLIC KEY | SIGNATURE OF PUBLIC KEY CERTIFICATE | VERIFICATION RESULT VALID TIME |
|---|---|---|---|
| CA_C1 | $K_{ca}C1$ | $S_{ca}C1$ | 11/27/2011 10:10:10.100 |
| CA_D2 | $K_{ca}C2$ | $S_{ca}D2$ | 11/27/2011 10:10:11.100 |
| CA_C2 | $K_{ca}C2$ | $S_{ca}C2$ | 11/27/2011 10:10:11.100 |
| ... | ... | ... | ... |

IN-VEHICLE COMMUNICATION SYSTEM

CROSS-REFERENCE TO RELATED APPLICATIONS

The disclosure of Japanese Patent Application No. 2012-226792 filed on Oct. 12, 2012 including the specification, drawings and abstract is incorporated herein by reference in its entirety.

BACKGROUND

The present invention relates to an in-vehicle communication system and, more particularly, to a technique which can be applied to an in-vehicle communication system using, for example, a public key encryption.

In recent years, aiming at reducing the transportation fatalities, studies of road-to-vehicle/vehicle-to-vehicle communications intended to support safety driving are being conducted. "road-to-vehicle" denotes "between a roadside device and a vehicle", and "vehicle-to-vehicle" denotes "between a vehicle and a vehicle". In services related to support of safety driving, the possibility that one erroneous message causes a big accident is high. It is therefore important to recognize that a message is transmitted from a right roadside device or a device mounted on a vehicle (in-vehicle device) and that a message transmitted from a right roadside device or an in-vehicle device is not altered by a malicious person, that is, to assure authenticity/integrity of a message.

One of schemes of assuring authenticity/integrity of message is an electronic signature using public key encryption. The public key encryption is method of performing encryption/decryption by using two keys as a set of a secret key and a public key. Although the secret key has to be managed in secret, the public key may be open. Therefore, in electronic signature using the public key encryption, a sender encrypts hash value (message digest) of a message with a secret key to generate a signature. The message sender transmits the signature together with the message. A message receiver obtains a public key of the sender and decrypts the received signature. The signature is verified by checking whether a decrypted value (hash value) is equal to a hash value generated from the received message.

The electronic signature using the pub is key encryption, has a problem of verification of validity of a public key. Generally, a certificate authority issues public key certificate. A public key certificate is a certificate coupling a public key and information of the owner of the public key, and carries a signature. A key used to generate a signature of a certificate is a secret key of a certificate authority. A message receiver obtains a public key certificate of a message sender and a public key of a certificate authority and verifies the public key, certificate and the signature, thereby verifying the validity of the public key. In this case, verification of validity of the public key of the certificate authority is an for the public key of the certificate authority. To the public key certificate a signature generated by the secret key of the certificate authority itself is designated. In the case where certificate authorities have a hierarchical structure, high-order certificate authority issues public key certificate of a low-order certificate authority.

Therefore, at the time of verifying a signature of message, a public key certificate of each of certificate authorities is verified, the public key certificate of the message send er is verified and, after that, the signature of the message is verified. That is, to verify the signature of the message, the public key certificate verification and signature verification have to be performed a plurality of times. In verification of a public key certificate, checks are made to see whether the certificate is before expiration or not, whether the public key certificate is not altered or not (verification of the signature of the public key certificate succeeds with the public key of the certificate authority or not), whether the certificate is revoked or not, and the like. For example, in the case where the certificate is expired or in the case where the verification of the signature with the public key of the certificate authority fails, it means that the verification of the public key certificate fails.

It takes relatively long time to execute verification of a public key certificate and verification of a signature the other hand in service aiming at support of safety driving, fast-response is required, and high-speed process is demanded for the verification of a public key certificate and signature verification. Techniques for shortening time required for the verification of a public key certificate and signature verification are described in the following patent literatures.

In patent literature 1, in road-to-vehicle communication, a public key certificate of a certificate authority succeeded in public key certificate verification is stored in an in-vehicle device. While a public key certificate of the same certificate authority is received, verification on the public key certificate of the certificate authority is omitted, and a public key certificate of a message sender (a roadside device) and a signature of a message are verified.

In patent literature 2, in vehicle-to-vehicle communication, in the case where a message receiver succeeds in verification of a public key certificate of a message sender, a received public key is stored together with reception time and position information into a memory. In the case where the same public key is received, verification of the public key certificate of the message sender is omitted. In the case where a public key whose present time lapsed for predetermined time since reception time or present position is far from reception position information in the stored in formation, registered information is deleted.

RELATED ART LITERATURE

Patent Literature 1 Japanese Unexamined Patent Publication No. 2007-88737
Patent Literature 2: Japanese Unexamined Patent Publication No, 2009-81524

SUMMARY

In the patent literatures 1 and 2, a public key certificate succeeded in verification is held. However, a public key certificate failed in verification is, not held. Consequently, for example, in the case where a message is frequently transmitted from a device (an in-vehicle device or a roadside device) holding an illegal public key, there is a problem that verification is performed each time a message is received, and it takes time for the process.

The other problems and novel features will become apparent from the description of the specification and appended drawings.

According to an embodiment, information of a device failed in verification of a public key certificate attached to the information is held in a memory (holding circuit. When a message is received, whether information of a device included in the message matches the information of the device held or not is checked. When there is a match, verification of public key certificates is not performed.

According to the embodiment, verification is not performed on the public key certificate which failed in the preceding verification, so that process time can be prevented from becoming long.

BRIEF DESCRIPTION OF THE DRAWINGS

FIGS. 4A and 4B are diagrams illustrating the structure of data held in the in-vehicle device according to the embodiment.

FIGS. 5A and 5B are diagrams illustrating the structure of data related to a certificate authority held in the in-vehicle device according to the embodiment.

DETAILED DESCRIPTION

Outline of Embodiments

Figure 1:
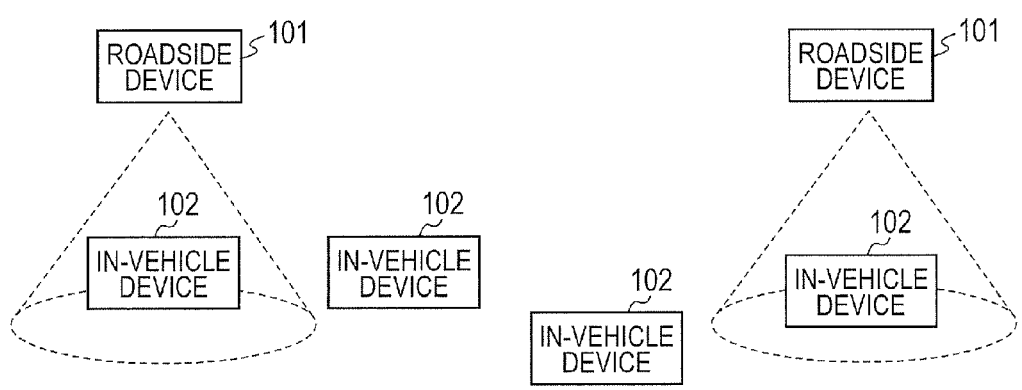
FIG. 1 is a diagram for explaining the relation between an in-vehicle device and a roadside device.

In the following description, the same reference numeral is designated to parts having the same function. For a part which is not described, refer to description of a part to which the same reference numeral is designated.

Figure 12:
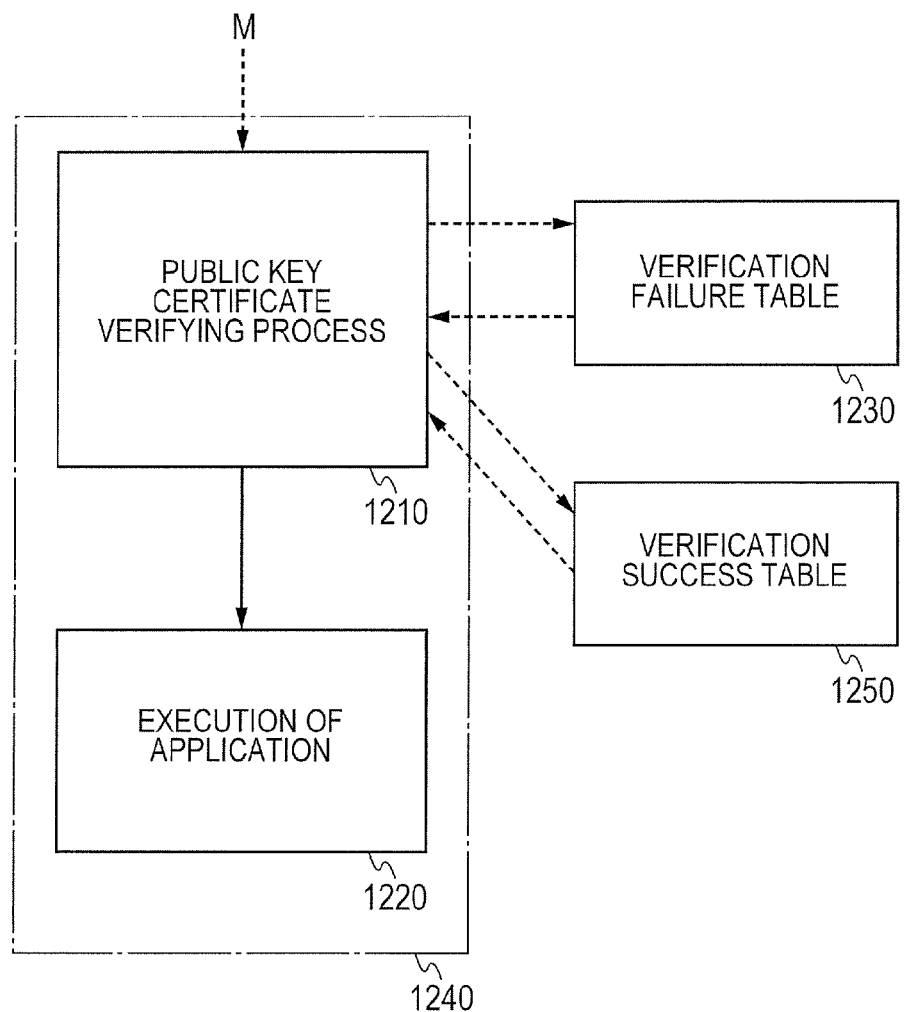
FIG. 12 is a block diagram of an in-vehicle communication system according to the embodiment.

First, outline of an embodiment will be described with reference to FIG. 12. The diagram illustrates an apparatus 1201 which receives a message M and processes the received message m. In the diagram, reference numeral 1240 denotes a process ing unit for receiving a message from another apparatus and processing information included in the message M. Reference numeral 1230 denotes a verification failure table provided for increase efficiency of verification of a public key certificate included in the message M. The verification failure table 1230 is formed in a memory (holding circuit) for managing information. The processing unit 1240 includes a unit 1210 for performing a process of verifying the public key certificate included in the message M (in the diagram, described as "public key certificate verifying process") and a unit 1220 executing application data included in the message M (in the diagram described as "execution of application"). The processing unit 1240 has a not-illustrated microprocessor (also called microcomputer or a CPU) and, when a microprocessor executes a program stored in a not-illustrated memory, functions of the units (process of certifying a public key certificate and execution of an application) are realized. In FIG. 12, to avoid complication of the diagram, description of "units" is omitted. For example, the unit 1220 for execution of application is written as "application execution 1220". As will be described later with reference to FIG. 6, in a public key certificate included in the message M, device information specifying a device which has sent the message M (message sender) is included.

In the verification failure table 1230, information of device which has failed in verification of the public key certificate is stored. In the public key certificate verifying process 1210, the device information included in the received message M and the device information stored in the verification failure table 1230 is compared. In the case where a match recognized by the comparison, in the public key certificate verifying process 1210, for example, verification of the signature of the public key certificate using a public key of a certificate authority included in the message is not executed. Consequently, the following message can be received and processed. In other words, increase in time required to verify the signature of a message can, be prevented.

Although not limited in the embodiment, information of a device which has succeeded in verification of the public key certificate (device information) is stored in a verification success table 1250. The verification success table 1250 is formed in a memory (holding circuit) in order to store information. Comparison between the device information included in the received message M and the device information stored in the verification success table 1250 is executed in the public key certificate verifying process 1210. When the device information stored in the verification success table 1250 and the device information in the message M matches, a process using the application data included in the received message M is executed in the application execution 1220.

When the device information included in the received message M does not match the device information stored in the verification failure table 1230 and the device information stored in the verification success table 1250, verification of the public key certificate is performed. In the case where the verification of the public key certificate fails, the device information can be supplied to the verification failure table 120 so that the device information stored in the verification failure table 1230 can be updated. On the other hand, in the case where the verification of the public key certificate succeeds, the device information is supplied to the verification success table 1250 so that the device information stored in the verification success table 1250 can be updated. In such a manner, the verification failure table 1230 and the verification success table 1250 can be updated. The updating is executed by, for example, rewriting device information which has elapsed long time with device information which is new in time. Also in the case where the memory in which the verification failure table 1230 and the verification success table 1250 are formed is limited, the memory can be efficiently used.

Embodiment

FIG. 1 illustrates the configuration of communication system between a vehicle and a vehicle and between a vehicle and a roadside device. A communication system 100 has roadside devices (apparatuses) 101 each disposed in a building or on a road and in-vehicle devices (apparatuses) 102 mounted in vehicles. The roadside device 101 is a device performing radio communication with the in-vehicle device 102. The roadside device 101 may be installed outdoor or indoor, or on a road. For example, it may be mounted in a device such as a traffic light or a gas station. Although the communication ranges of the roadside devices 101 are not overlapped as illustrated, in broken lines in FIG. 1, obviously, they may be overlapped. One in-vehicle device 102 performs radio communication with the roadside device 101 and other in-vehicle devices 102. The in-vehicle device 102 may be mounted in a device other than a vehicle. In the following embodiment, an example that the in-vehicle device 102 is mounted on a vehicle will be described. By the radio communication, a vehicle on which the in-vehicle device 102 is mounted can grasp the state of another vehicle by communication with an other in-vehicle device, and can grasp traffic jam state and the like by communication with the roadside device 101.

Figure 2:
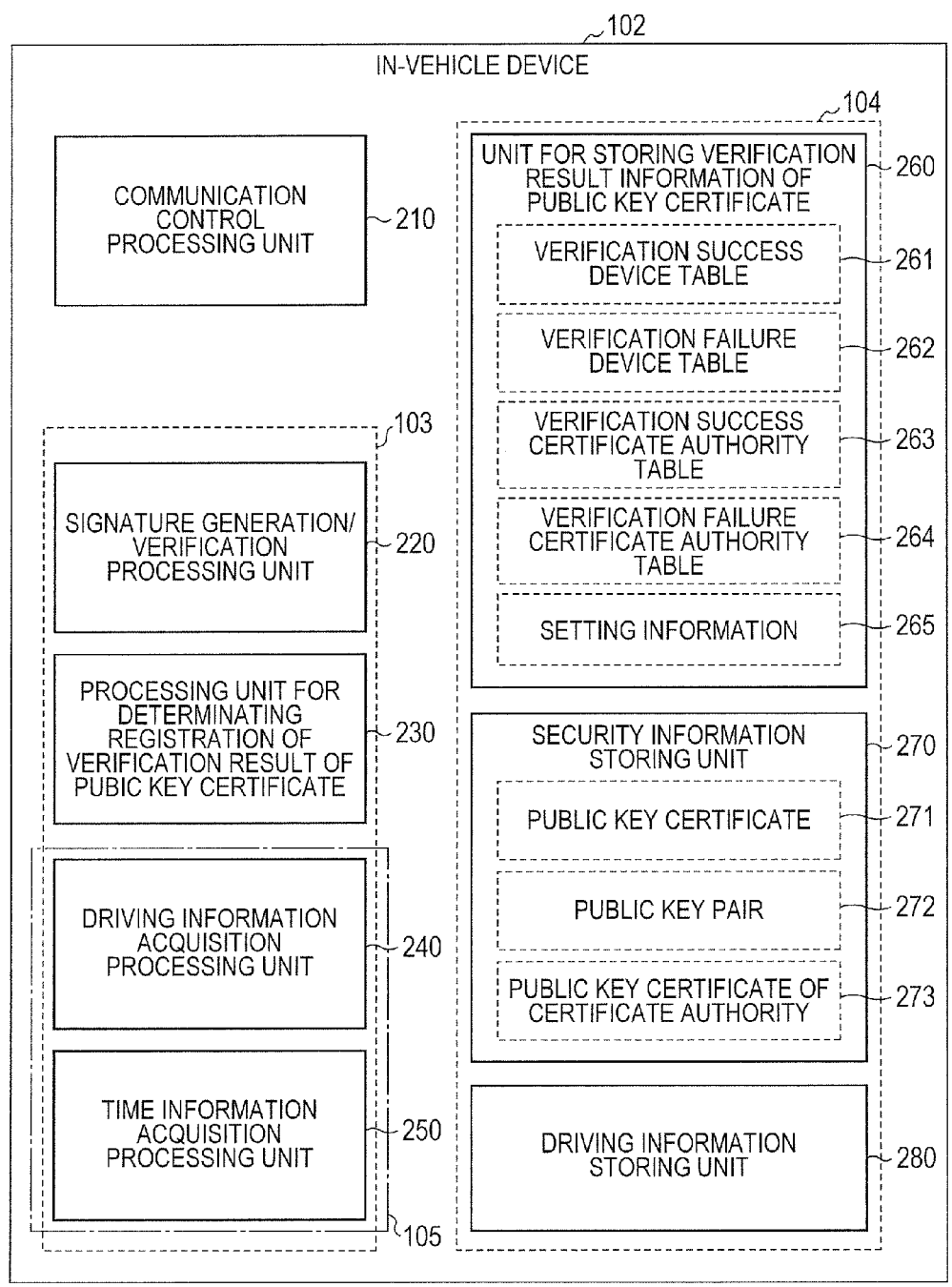
FIG. 2 is a block diagram illustrating the configuration of a device mounted on a vehicle according to an embodiment.

FIG. 2 is a block diagram illustrating a device mounted on a vehicle and, particularly, a functional configuration of the in-vehicle device 102 transmitting/receiving a message and performing security process. Each of the plurality of in-vehicle devices 102 illustrated in FIG. 1 may have the configuration of FIG. 2 or one in-vehicle device 102 may have the configuration of FIG. 2.

The functions illustrated in FIG. 2 are realized by microcomputer (hereinbelow, also called CPU) 103, a memory, a communication device, a GPS device, and the like. In this case, by executing a program stored in the memory by the CPU 103, the CPU 103 achieves the functions. Obviously, the functions may be achieved by different circuits. In the specification, functions will be called units, and it is to be understood that the invention includes both a case where each of the functions is achieved by executing a program by the CPU 103 and a case where the functions are achieved by different circuits. For example, the function of a communication control processing unit 210 to be described later is achieved by a communication device. Each of a signature generation/verification processing unit 220 and a processing unit 230 for determining registration a verification result a public key certificate (hereinbelow, also called "registration determination processing unit") is achieved by the CPU 103 and a first memory (not illustrated) storing a program for operating the CPU 103 and data. Similarly, each of a driving information acquisition processing unit 240 and a time information acquisition processing unit 250 is achieved by a GPS device 105, the CPU 103, and a first memory storing a program for operating the CPU 103 and data. Each of a unit 260 for storing verification result of a public key certificate (hereinbelow, also called "verification result information storing unit") a security information storing unit 270, and a driving information storing unit 280 is achieved by a second memory 104. The CPU 103 may not be a single microcomputer but, may be configured by a plurality of microcomputers. Similarly, the second memory 102 may not be a single memory but may be configured by a plurality of memories. As described above, the function of each of units is realized when the CPU 103 executes the program stored in a storing device (the not-illustrated first memory). The program may be pre-stored in the storing device (first memory) or, as necessary, loaded from a storing medium or another device by communication.

As described above, the in-vehicle device 102 has the communication control processing unit 210, the signature generation/verification processing unit 220, the driving information acquisition processing unit 240, and the time information acquisition processing, unit 250. The in-vehicle device 102 has a verification result information storing unit 260, a security information storing unit 270, and a driving information storing unit 280. The communication control processing unit 210, the signature generation/verification processing unit 220, the registration determination processing unit 230, the driving information acquisition processing unit 240, and the time information acquisition processing unit 250 are also called processing units 210, 220, 230, 240, and 250, respectively. The verification result information storing unit 260, the security information storing unit 270, and the driving information storing unit 280 are also called storing units 260, 270, and 280, respectively.

The communication control processing unit 210 performs a process for executing communication with the roadside device 101 and the in-vehicle devices 102 mounted on other vehicles. The signature generation/verification processing unit 220 generates a signature of a message to be transmitted to the roadside device 101 or the in-vehicle device 102 mounted on another vehicle. The signature genera ion/verification processing unit 220 also executes a process of verifying a signature of a message received from the roadside device 101 or another in-vehicle device 102 via the communication control processing unit 210 and a process of verifying a message sender and a public key certificate of a certificate authority. The message senders denote here the roadside devices 101 and the other in-vehicle devices 102.

The registration determination processing unit 230 determines whether the result of the verification of the public key certificate made by the signature generation/verification processing unit 220 is held in the in-vehicle device 102 or not and, in the case where the result is held, registers information of the verification result into the verification result information storing unit 260.

The driving information acquisition processing unit 240 acquires information on driving such as the travel direction, the present position, and speed of a vehicle having the in-vehicle device 102 by using, for example, the GPS device 105. The time information acquisition processing unit 250 obtains present time.

The verification result information storing unit 260 stores verification results of the roadside device 101, another in-vehicle device 102, and the public key certificate of the certificate authority, and a policy regarding registration determination. In the diagram, the verification result information storing unit 260 has a verification success device table 261, a verification failure device table 262, verification success certificate authority table 263, verification failure certificate authority table 264, and setting information 265. The verification success device table 261 is a table for registering information of a roadside device or an in-vehicle device succeeded in verification of the public key certificate. The verification failure device table 262 is a table for registering information of a roadside device or an in-vehicle device failed in verification of the public key certificate. The verification success certificate authority table 263 is a table for registering information of a certificate authority succeeded in verification of the public key certificate. The verification failure device table 264 is a table for registering information of a certificate authority failed in verification of the public key certificate. The setting information 265 is a table in which the maximum number of pieces of information which can be registered in each of the tables and various thresholds used for registration determination are set. The details of the verification success device table 261, the verification failure device table 262, the verification success certificate authority table 263, and the verification failure certificate authority table 264 will be described later with reference to FIG. 4 and FIGS. 5A and 5B.

The security information storing unit 270 is a unit for storing security information of the in-vehicle device 102 itself. In the security information storing unit 270, a public key pair 272, a public key certificate 271, and a public key certificate 273 of a certificate authority are stored. The public key pair 272 is made of a secret key for generating signature and a public key for signature verification. The public key is sent together with a message to an in-vehicle device of another vehicle or a roadside device. A device which receives the message (message receiver) uses the public key to verify the signature of the received message. The message receiver is the in-vehicle device mounted on another vehicle or the roadside device. The public key certificate 271 is used by the message receiver to verify the received public key and is issued by a certificate authority. The public key certificate 271 is an identifier for identifying a public key certificate (hereinbelow, called ID (identification)), a public key, and a device ID for identifying a public key owner (an identifier for identifying the device of the message sender and also called as device information in the specification) and is configured by a certificate authority ID for identifying a certificate authority issuing a certificate, expiration date of a certificate, a signature scheme of a certificate, and signature.

The signature is generated by using the secret key of the certificate authority, and the message receiver verifies the public key certificate of the message sender by, using the public key of the certificate authority. The certificate authority public key certificate 273 is provided to verify the public key for verifying the public key certificate.

Figure 3:
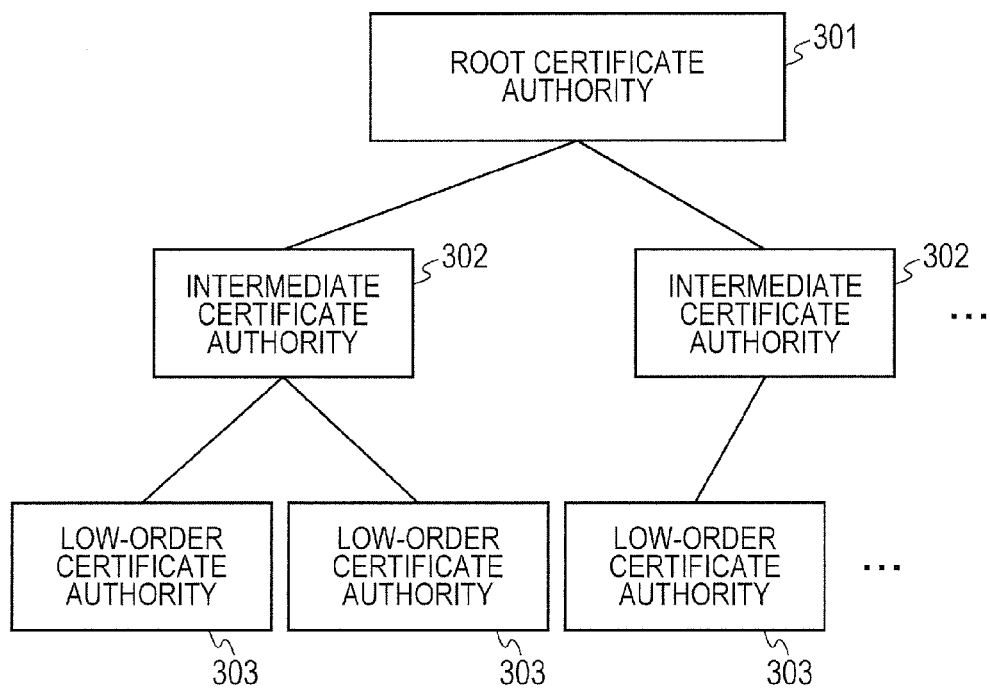
FIG. 3 is a diagram illustrating the configuration of a certificate authority.

A plurality of certificate authorities exist and may have a hierarchical structure as illustrated in FIG. 3. That is, a root certificate authority 301 as a high-order certificate authority a plurality of intermediate certificate authorities 302 below the root certificate authority 301, and a plurality of low-order certificate authorities 303 below the intermediate certificate authorities 302 may be provided. In the case of employing such a hierarchical structure, the root certificate authority 301 issues public key certificate of the intermediate certificate authority 302, and the intermediate certificate authority 302 issues a public key certificate of the low-order certificate authority 303. The root certificate authority 301 issues a public key certificate of itself signed with a secret key of itself. Therefore, in the case where the certificate authorities have the hierarchical structure, plurality of public key certificates 273 of the certificate authorities exist. Obviously, the hierarchical structure as described above may not be employed.

Referring again to FIG. 2, the driving information storing unit 280 stores information obtained by the driving information acquisition processing unit 240. The verification result storing unit 260, the security information storing unit 270, and the driving information storing unit 280 are collections of data and stored in one or a plurality of memories (holding circuits). The memory is illustrated by a broken line 104 in the diagram.

FIGS. 4A and 4B illustrate data structures of the verification success device table 261 and the verification failure device table 262 as collections of data. The verification success device table 261 illustrated in FIG. 4A is held in the verification result information storing unit 260 in the in-vehicle device 102. In the verification success device table 261, information of the roadside device 101 or another in-vehicle device 102 succeeded in validity when the signature generation/verification processing unit 220 verifies validity of a public key certificate is registered. The information (data) to be registered has a device ID 411 of a message sender (in the diagram, written as "device ID"), verification result valid time 412, and a public key 413. The device ID 411 is an identifier referring to the roadside device 101 or the in-vehicle device 102 succeeded in the verification of validity of the public key certificate. The verification result valid time 412 indicates the limit of time of using the device as the device succeeded in the verification of validity, of the public key certificate. The public key 413 is the public key of the roadside device 101 or the in-vehicle device 102 succeeded in the verification of validity of the public key certificate. In the diagram, OBU_A, OBU_B, RSU_A, . . . are written as examples of the device ID 411. As examples of the public key 413, KobuC, KobuD, KrsuC, are written. As an example of the verification result valid time 412, 2011/11/27 10:10:10.100 is written.

The verification failure device table 262 illustrated in FIG. 4B is held in the verification result information storing unit 260 in the in-vehicle device 102. In the verification failure device table 262 when the signature generation/verification processing unit 220 executes verification of validity of a public key certificate, information of the roadside device 101 or, the in-vehicle device 102 failed in the verification of validity of the public key certificate is registered. Information registered includes a device ID 421, a public key 422, a signature 423 of the public key certificate (hereinbelow, also simply called "signature"), and verification result valid time 424. The device ID 421 is an identifier of the roadside device 101 or the in-vehicle device 102 failed in the verification of validity of the public key certificate. The public key 422 is the public key of the roadside device 101 or the in-vehicle device 102 failed in the verification of validity. The signature 423 is a signature written in the public key certificate of the roadside device 101 or the in-vehicle device 102 failed in the verification of validity. The verification result valid time 424 indicates the limit of time of using the device as the device failed in the verification. Like FIG. 4A, in FIG. 4B, OBU_C, OBU_D, RSU_C, are written as examples of the device ID 421. As examples of the public key 422, KobuC, KobuD, KrsuC, . . . are written. As examples of the signature 423 of the public key certificate, SobuC, SobuD, SrsuC, . . . are written. As an example of the verification result valid time 424, 2011/11/27 10:10:10.100 is written.

FIGS. 5A and 5B illustrate data structures of the verification success certificate authority table 263 and the verification failure certificate authority table 264 as collections of data. The verification success certificate authority table 263 illustrated in FIG. 5A is held in the verification result information storing unit 260 in the in-vehicle device 102. In the verification, success certificate authority table 263, information of a certificate authority succeeded in verification of validity when the signature generation/verification processing unit 220 verifies validity of a public key certificate is registered. The verification success certificate authority table 263 has a certificate authority ID 531 for identifying a certificate authority, a public key 533 of the certificate authority, and verification result valid time 532. The certificate authority ID 531 is an identifier of a certificate authority succeeded in the verification of validity of the public key certificate. The verification result valid time 532 indicates the limit of time of using the certificate authority as the certificate authority succeeded in the verification of validity of the public key certificate.

FIG. 5B is a diagram illustrating the data structure of the verification failure certificate authority table 264 held in the verification result information storing unit 260 in the in-vehicle device 102. In the verification failure certificate authority table 264, information of a certificate authority failed in verification of validity of a public key certificate when the signature generation/verification processing unit 220 verifies validity of the public key certificate is registered. The verification failure certificate authority table 264 has a certificate authority ID 541, a public key 542, a signature 543 of a public key certificate (hereinbelow, also simply called "signature"), and verification result valid time 544. The certificate authority ID 541 is an identifier of a certificate authority failed in the verification of validity of the public key certificate. The public key 542 is a public key of a certificate authority designated by the certificate authority ID 541. The signature 543 is a signature written in the public key certificate of the certificate authority designated by the certificate authority ID 541. The verification result valid time 544 indicates the limit of time of using the certificate authority, as the certificate authority failed in the verification.

Also in FIGS. 5A and 5B, examples of the certificate authority IDs 531 and 541, the public keys 533 and 542, the verification result valid time 532 and 544, and the signature 543 are illustrated. For example, in FIGS. 5A and 5B, CA_A1 and the like are shown as the certificate authority IDs 531 and 541, and KcaC1 and the like are shown as the public keys 533 and 542. ScaC1 and the like are shown as examples of the signature 543, and 2011/11/27 10:10:10.100 and the like are shown as examples of the verification result valid time 532 and 544.

Figure 6:
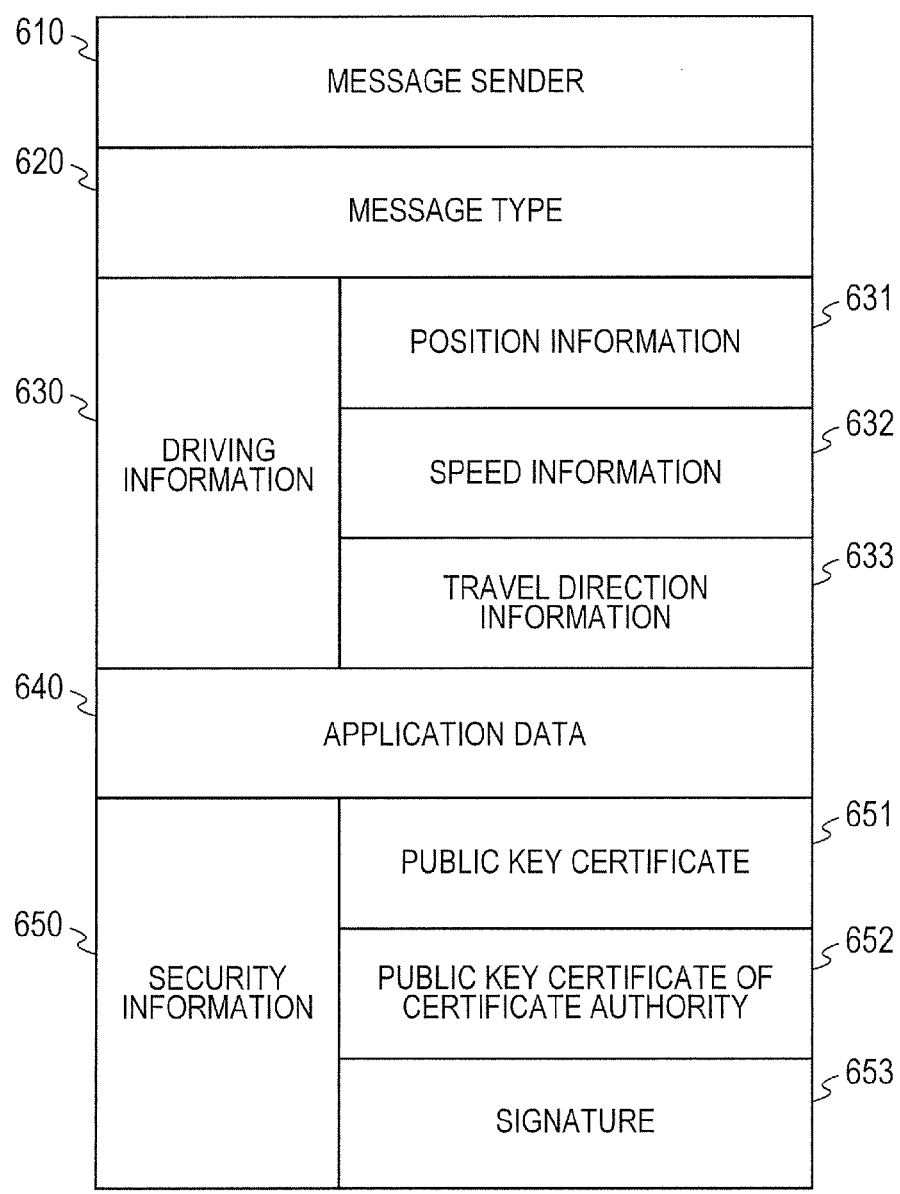
FIG. 6 is a diagram illustrating the structure of a message according to the embodiment.

FIG. 6 illustrates an example of a format of a message send from the roadside device 101 or the in-vehicle device 102. The message M is comprised of a message sender 610, message type 620, driving information 630, application data 640, and security information 650. The message sender 610 is the identifier of a message sender, and the message type 620 is used to identify the type of a message. The driving information 630 is information related to driving of the message sender and has position information 631, speed information 632, and travel direction information 633. In the case where the message sender 610 is the roadside device 101, the position information 631 in the driving information 630 is a mounting position of the roadside device 101, the speed information 632 is always zero, and the travel direction information 633 is also zero. The application data 640 is information delivered from the message sender to the message receiver. The security information 650 is information for guaranteeing authenticity/completeness of a message and has a public key certificate 651, a certificate authority public key certificate 652, and a signature 653. The public key certificate 651 is a public key certificate of the message sender, the public key certificate 652 of the certificate authority is a certificate of a public key for verifying the validity of the public key certificate 651, and the signature 653 is used to verify authenticity/completeness of the message. In the case where the in-vehicle device 102 is the message sender, the public key certificate 271 of the security information storing unit 270 (FIG. 2) is set in the public key certificate 651, and the public key certificate 273 of the certificate authority of the security information storing, unit 270 (FIG. 2) is set in the public key certificate 652 of the certificate authority. The signature 653 is generated by using a secret key, in the public key pair 272 in the security information storing unit 270 (FIG. 2).

Figure 7:
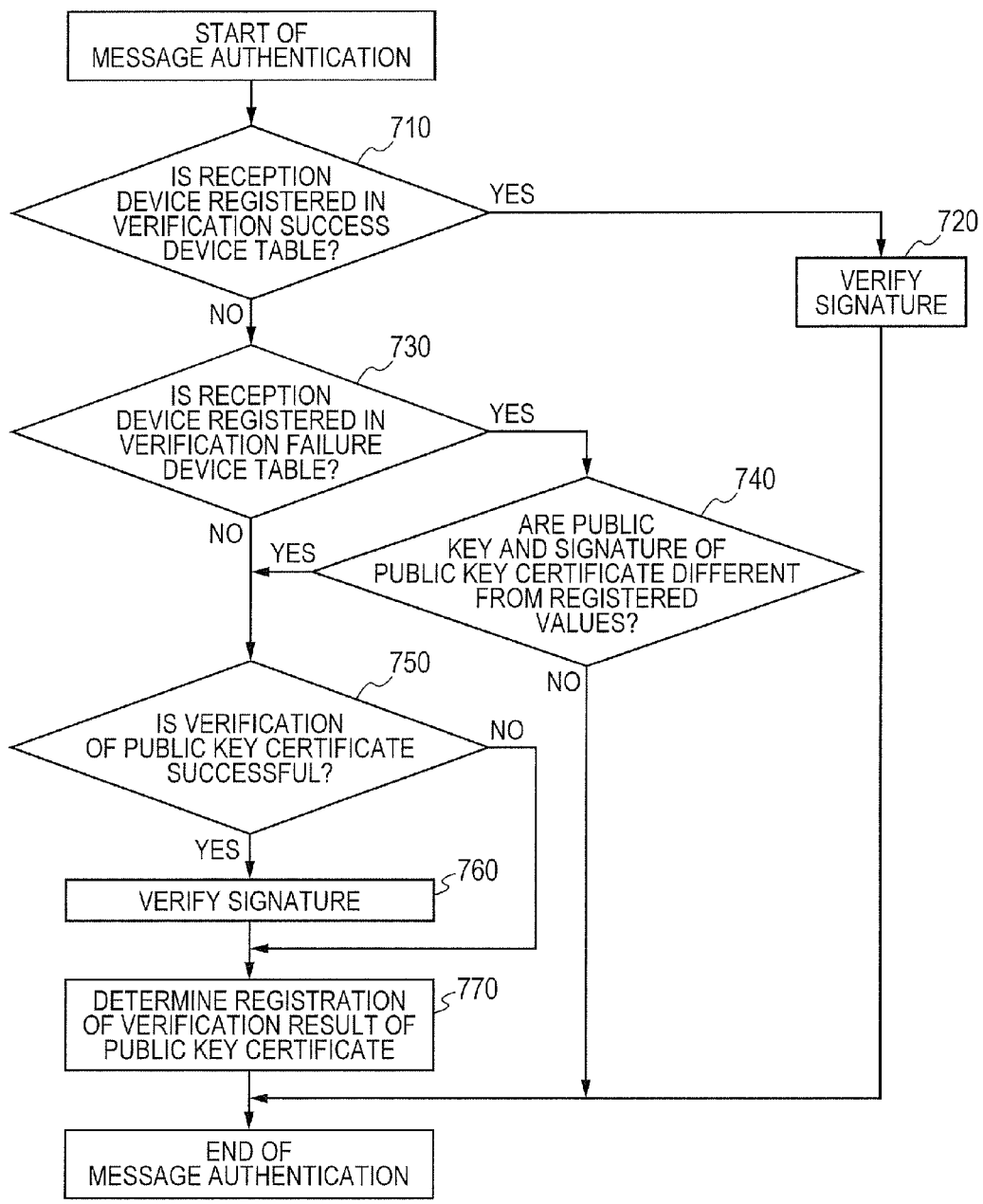
FIG. 7 is a diagram illustrating a process flow when the in-vehicle device according to the embodiment receives a message.

FIG. 7 illustrates a flow of processes of message authentication in the case where the in-vehicle device 102 receives a message having the format illustrated in FIG. 6. The process is achieved when the above-described processing units 220, 230, 240, and 250 (FIG. 2) execute a not-illustrated program using the storing units 260, 270, and 280 (FIG. 2).

On receipt of a message via the communication control processing unit 210, the in-vehicle device 102 starts message authentication illustrated in FIG. 7 (in the diagram, it is described as "start of message authentication"). In step 710, whether the device ID described included in the public key certificate 651 in the security information 650 (FIG. 6) exists in the verification success device table 261 (FIG. 2) or not is checked. In FIG. 7, it is described that "Is reception device registered in verification success table?" In the case where the device ID exists in the verification success device table 261, whether the device ID exists as the device ID 411 (FIG. 4A) in the verification result valid time or not is recognized in the step 710. Whether the times within the verification result valid time or not is determined on the basis of whether present time obtained from the time information acquisition processing unit 250 is time before the verification result valid time 412 or not. In the case where the device ID exists in the verification success device table 261 and the message reception time is before the verification result valid time 412, a check is made to see whether the public key described (included) in the public key certificate 651 and the public key 413 registered in the verification success device table 261 are the same value or not in step 710.

In the case where the device ID included the received message exists in the verification success device table 261, the message reception time is before the verification result valid time 412, and the public key described (included) in the public key certificate 651 and the public key 413 registered in the verification success device table 261 are the same value, it is regarded that the verification of the public key certificate of the message sender is successful. In this case, the process on verification of the public key certificate is omitted and the routine advances to step 720. Step 720 relates to verification of a signature. Using the public key described (included) in the public key certificate 651 of the message, the signature 653 (FIG. 6) of the message is verified, and the message authentication is finished. Specifically, in step 720, a value obtained by decoding the signature with the public key and a hash value of the message are compared and a check to see whether they match or not is executed. After completion of the message authentication (in FIG. 7, described as "end of message authentication"), although not illustrated in FIG. 7, a message process according to a signature verification result is performed. In the case where the signature verification is successful, in the message process, a process on the application data 640 (FIG. 6) is performed in the application execution 1220 (FIG. 12). On the other hand, in the case where the signature verification fails, in the message process, application data is discarded in the application execution 1220 (FIG. 12). As described above, the discarding of the application data in the case where the signature verification fails may not be performed by the application execution 1220 but may be performed in the public key certificate verifying process 1210.

On the other hand, in the case where the device ID included in the received message does not exist as a device within the verification result valid time in the verification success device table 261, the routine advances to step 730. In step 730, a check is made to see whether or not a device ID exists as the device ID 421 within the verification result valid time (FIG. 4B) in the verification failure device table 262 (FIG. 2). In FIG. 7, is described as "is reception device registered in verification failure device table?" In the case where, the device ID included in the received message does not exist as the device ID 411 in the verification success device table 261, or in the case where the device ID included in the received message exists as the device ID 411 but is out of the verification result valid time, step 730 is executed.

In the case where the device ID exists as the device within the verification result valid time in the verification failure device table 262 in step 730, subsequently, step 740 is executed. In step 740, a check is made to see whether or not the public key and the signature included in the public key, certificate 651 in the received message have the same values as the public key 422 (FIG. 4B) in the verification failure device table 262 and the signature 423 (FIG. 4B) in the public key certificate (in FIG. 7, is described "are public key and signature of public key certificate different from registered values?"). In the case where they have the same values, it is regarded that the public key certificate of the message sender fails in verification and, the verification of the signature of the message fails, and the message authentication is finished. In FIG. 7, it is described as "end of message authentication". After that, a process of the case where the verification of the signature of the message fails is executed. In this case, for example, a process of discarding the received message is executed. On the other hand, when it is determined in the checking process in step 740 that the values are different, subsequently, step 750 is executed. Also in the case where the device ID does not exist in the verification failure device table 262 in step 730, subsequently, step 750 is executed.

As described above, in the case where the device ID included in the received message exists as the device within the verification result valid time in the verification success device table 261 and the public key included in the received message is the same as the public key registered in the verification success device table 261, verification of the public key certificate is omitted, authentication of the message is performed, and the process using the application data can be executed. Consequently, the process load can be lessened. In the case where the device ID included in the received message exists as the device within the verification result valid time in the verification failure device table 262, it is regarded that the public key certificate of the message sender fails in verification, and the message authentication is finished. As a result, the process load can be lessened.

In step 750, verification of the public key certificate of each of the message sender and the certificate authority is executed. In FIG. 7, it is described as "is verification of public key certificate successful?" The step 750 is provided to verify the public key certificate of each of the sender and the certificate authority for a reason that the device ID included in the received message does not exist in both of the verification success device table 261 and the verification failure device table 272. Since the details of verification of a public key certificate will be described later with reference to FIG. 8, they are not described here. In the case where the verification of the public key certificate succeeds in step 750, in step 760, the signature 653 (FIG. 6) is verified by using the public key described in the public key certificate 651 (FIG. 6), and the routine advances to step 770. On the other hand, in the case where the verification of the public key certificate fails in step 750, it is regarded that the verification of the message fails, and the routine advances to step 770. In step 770, whether the result of the verification of the public key certificate in step 750 is registered in the verification result information storing unit 260 (FIG. 2) or not is determined, and a process according to the determination result is performed. Since the details of the step 770 will be described later with reference to FIGS. 9 to 11, they are omitted here.

Figure 8:
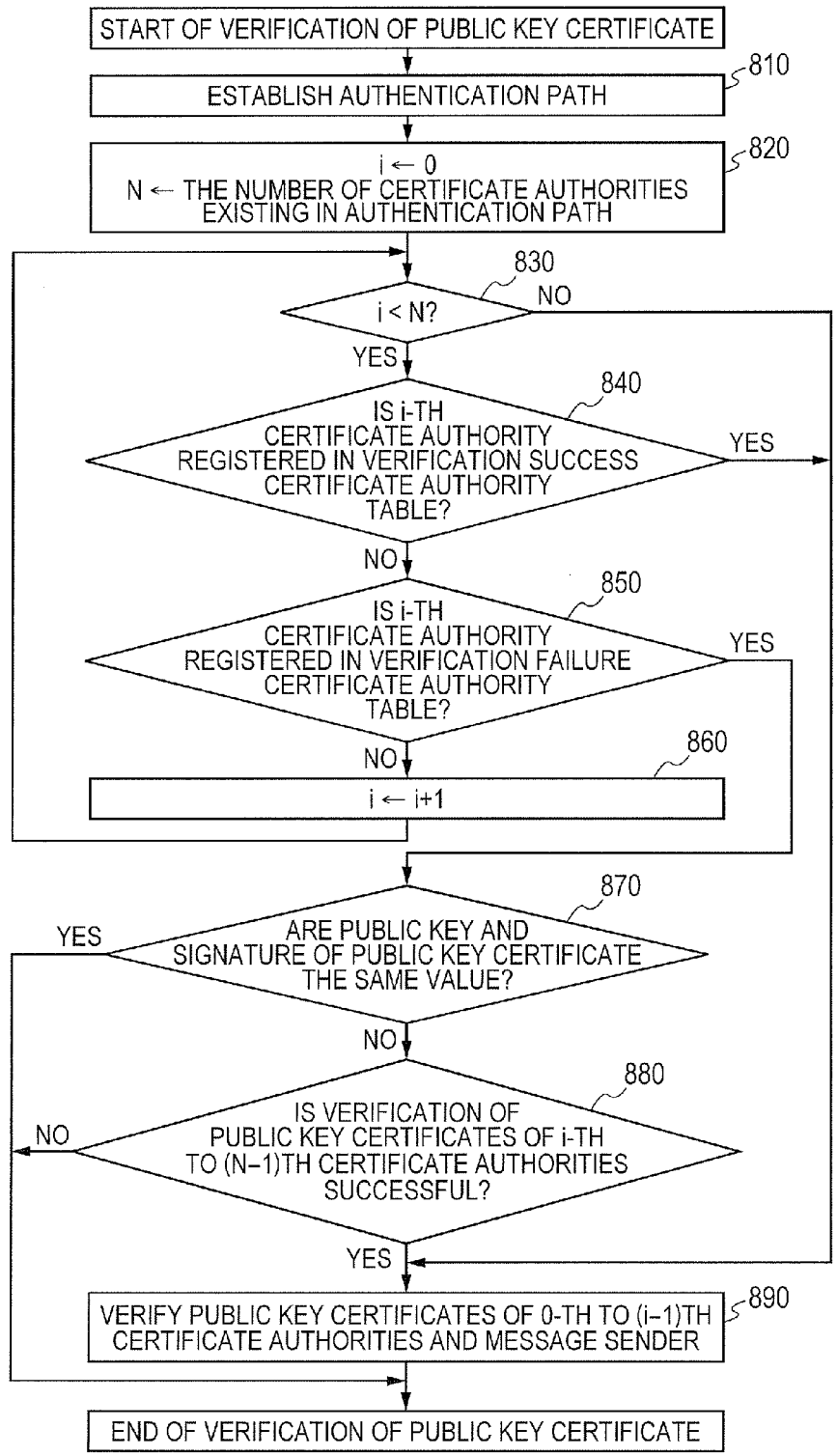
FIG. 8 is a diagram illustrating a process flow when the in-vehicle device according to the embodiment verifies a public key certificate of a certificate authority.

Referring now to FIG. 8, verification of a public key certificate will be described. In the case where the certificate authorities have a hierarchical structure as illustrated in FIG. 3, to verify a public key certificate of a message sender, an authentication path to a root certificate authority 301 is established in step 810. In FIG. 8, it is described as "establish authentication path". Specifically, a path of a low-order certificate authority 303, an intermediate certificate authority 302 acknowledging the low-order certificate authority 303, and the root certificate authority 301 acknowledging the intermediate certificate authority 302 is found. To execute it, in steps 820 to 890, from the low-order certificate authority 303 as a certificate authority existing in the authentication path toward the root certificate authority 301, whether or not information of the certificate authority included in the message M is registered in the verification success certificate authority table 263 (FIG. 2) or the verification failure certificate authority table 264 (FIG. 2) is checked in order. In the case where the information is registered in the verification success certificate authority table 263 or the verification failure certificate authority table 264, for verification of public key, certificates from the certificate authority registered to the root certificate authority 301, a result registered in the verification success certificate authority table 263 or the verification failure certificate authority table 264 is used. In such a manner, the load of processes related to the verification of a certificate authority, can be reduced. In the case where the information is not registered in any of the verification success certificate authority table 263 and the verification failure certificate authority table 264, verification of the public key certificate of each of certificate authorities is performed.

Concretely, in step 820, an initializing process for checking certificate authorities in order from the low-order certificate authorities 303 is performed. Specifically, process of setting a variable "i" to zero and setting the number of certificate authorities existing in the authentication path to a variable "N" is performed in step 820. In FIG. 8, it is described that "i<−0, N<−the number of certificate authorities existing in the authentication path". For example, a certificate authority certifying, a certificate authority is specified and, when the specified certificate authority is itself, it is determined that the specified certificate authority is the root certificate authority 301. The certificate authority certifying a certificate authority is specified by the public key certificate 273 of the certificate authority, and the number of certificate authorities until the root certificate authority 301 is set as the number N of certificate authorities up to the root certificate authority.

In step 830, whether public key certificates of all of certificate authorities (it means all of certificate authorities on the authentication path) are checked or not is determined from the relation between the variable "i" and the variable N (in FIG. 8, it is described as "i<N"). In the case where the public key certificates of all of the certificate authorities are checked and are not registered in the verification success certificate authority table 263 or the verification, failure certificate authority table 264, step 890 is executed. In step 890, since information registered in any table cannot be also used, the public key certificates of all of certificate authorities and the public key certificate of the message sender are verified. In FIG. 8, it is described as "verify public key certificates 0-th to (i−1)th certificate authorities and the message sender".

In the case where it is determined that the public key certificates of all of certificate authorities are not checked in step 830, step 840 is executed. In step 840, a check is made see whether or not the i-th (i=0, ..., N−1, and N: the number of certificate authorities existing in the authentication path) certificate authority from the low-order certificate authority is registered in the certificate authority ID 531 (FIG. 5A) of the verification success certificate authority table 263. In FIG. 8, "is i-th certificate authority registered in verification success certificate authority table?" is described in step 840. The state of registration in the verification success certificate authority table denotes a case where a certificate authority ID described (included) in the public key certificate 652 of a certificate authority exists in the certificate authority ID 531, the present time is time before the verification result valid time 532, and the public key described (included) in the public key certificate 652 of the certificate authority has the same value as the public key 533. In the case where the certificate authority is registered, it is regarded that validity of the public key certificates of the certificate authorities from the i-th certificate authority to the root certificate authority is verified, and step 890 is executed. In step 890, public key certificates from the low-order certificate authority as the zero-th certificate authority to the (i−1)th certificate authority are verified.

In the case where verification of the public key certificate of any of certificate authorities fails in step 890, or in the case where verification of the public key certificate of the message sender fails, it is regarded that the verification of the public key certificates fails, and the public key certificate verifying process is finished (in FIG. 8, "end of verification of public key certificate").

On the other hand, in the case where verification of the public key certificates of all of certificate authorities from the low-order certificate authorities to the (i−1) th certificate authority succeeds in step 890, the public key certificate of the message sender is, verified and, using the result of the verification as a result of verification of the public key certificate, the process is finished.

In the case where the i-th certificate authority is not registered in the verification success certificate authority table 263, step 850 is executed. In step 850, a check is made to see whether the i-th certificate authority is registered in the verification failure certificate authority table 264 or not. In FIG. 8, "is i-th certificate authority registered in verification failure certificate authority table?" is written in step 850. The state of registration in the verification failure certificate authority table denotes a case where a certificate authority ID described (included) in the public key certificate 652 of a certificate authority exists in the certificate authority ID 541 and the present time is before the verification result valid time 544. In the case where it is determined by the check that the certificate authority is registered, step 870 is executed. In step 870, a check is made to see whether the values of the public key 542 (FIG. 5B registered in the verification failure certificate authority table 264 (FIG. 2) and the signature 543 (FIG. 5B) of the public key certificate and the values of the public key of the public key certificate of the certificate authority included in a received message and the signature are equal to each other. In FIG. 8, "are public key and signature of public key certificate the same value?" is written in step 870. In the case where they are equal, it is regarded that, the verification of the public key certificate of the i-th certificate authority fails, and the process is finished. On the other hand, in the case where they are not equal, verification of public key certificates from the i-th certificate authority to the root certificate authority is performed in step 880. In FIG. 8, "is verification of public key certificates of i-th to (N−1) th certificate authorities successful?" is written in step 880. In the case where the verification of the public key certificates of all of certificate authorities succeeds in step 880, the public key certificates of certificate authorities from the zero-th to (i−1)th certificate authorities as low-order certificate authorities are verified in step 890. A result of the verification in step 890 is used as a result of the verification of the public key certificates, and the process is finished. When the verification of the public key certificate of any of the certificate authorities fails in the above-described step 880, failure in the verification of the public key certificate is determined, and the process is finished.

In step 860, when a certificate authority is not registered in the verification success certificate authority table 263 and the verification failure certificate authority table 264, to check whether a high-order certificate authority is registered or not, the value of the variable "i" is incremented by one. In FIG. 8, "i←i+1" is written in step 860. After the variable "i" is incremented, the routine is returned to step 830.

Figure 9:
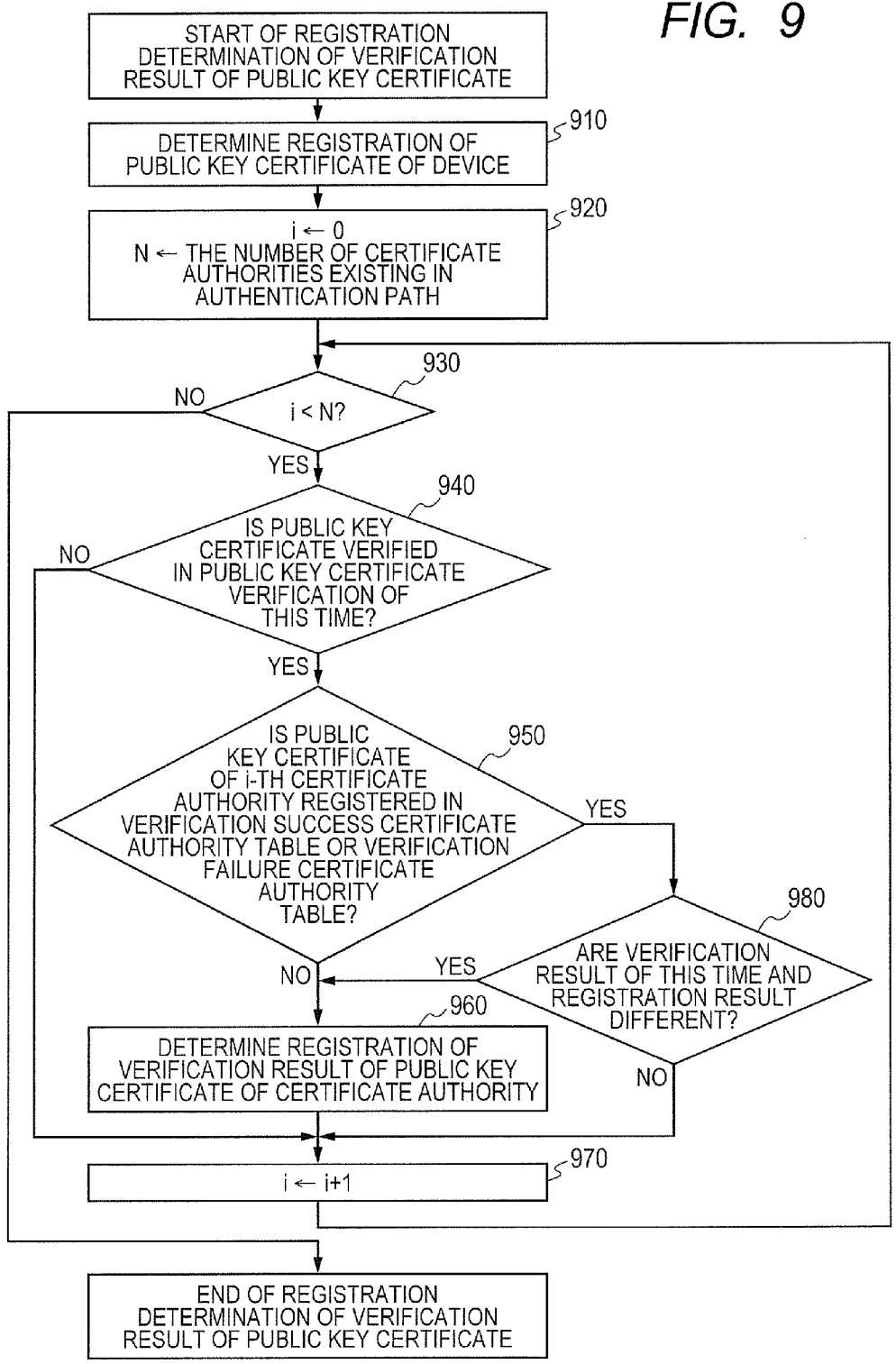
FIG. 9 is a diagram illustrating a flow when the in-vehicle device according to the embodiment processes a public key certificate.

FIG. 9 is a diagram illustrating a detailed flow of step 770 in FIG. 7. In the case where the verification result of the public key certificate of the device (the roadside device 101 or the in-vehicle device 102) as the message sender is not registered in the verification success device table 261 or the verification failure device table 262, whether the verification result of this time is registered or not is determined.

First, in step 910, registration determination of the public key certificate of the device is performed. As the details of the registration determination will be described with reference to FIG. 10, they are not described here. Subsequently, in steps 920 to 980, whether the public key certificates of all of certificate authorities used in the verification of the public key certificate of the device are registered or not is determined. Although an example of determining whether the public key certificates of all of certificate authorities are registered or not is described in the embodiment, whether public key certificates of a part of certificate authorities are registered or not may be determined in accordance with security policy. In the case of determining a part of certificate authorities, for example, it is sufficient to register security policy not to register the public key certificate of a specific low-order certificate authority as the setting information 265 (FIG. 2) and use the security policy as a determination condition.

Referring again to FIG. 9, the embodiment will be described. First, in step 920, initializing process for performing a check from a low-order certificate authority is performed. In the initializing process, like in step 820 in FIG. 8, zero is set for the variable "i", and the number of certificate authorities existing in an authentication path is set for the variable N. In step 930, whether public key certificates of all of certificate authorities are checked or not is determined. In FIG. 9, "i<N" is written in step 930. In the case where the variable "i" is larger than the variable N, the public key certificates of all of the certificate authorities are checked. In the case where the public key certificates of all of certificate authorities are checked and the result registered in the verification success certificate authority table 263 or the verification failure certificate authority table 264 is used in verification of the public key certificate of this time, verification of a public key certification is not newly executed. In this case, it is determined that there is no information of a certificate authority newly registered in the verification success certificate authority table 263 or the verification failure certificate authority table 264, and the process is finished. In FIG. 9, "end of registration determination of verification result of public key certificate" is written.

In the case where the variable "i" is smaller than the variable N, in step 940, a check is made to see whether or not verification of the public key certificate of the i-th certificate authority of this time is executed without being omitted. In FIG. 9, "is public key certificate verified in public key certificate verification of this time?" is written in step 940. In the case where the verification is omitted, step 970 is executed next. The variable "i" is incremented in step 970, the routine returns to step 930, and registration of a next certificate authority is determined. On the other hand, in the case where the verification is not omitted, step 950 is executed next.

In step 950, a check is made to see whether or not a verification result of the public key certificate of the i-th certificate authority is already registered in the verification success certificate authority table 263 or the verification failure certificate authority table 264 on the basis of certificate authority ID. In FIG. 9, in step 950, "is public key certificate of i-th certificate authority registered in verification success certificate authority table or verification failure certificate authority table?" is written. In the case where the corresponding certificate authority ID is not registered, the routine advances to step 960. On the other hand, in the case where the corresponding certificate authority ID is already registered, the routine advances to step 980. In step 980, whether the verification result of this time and the result registered in the table are different from each other or not is determined. In FIG. 9, "are verification result of this time and registration result different?" is written. When it is determined that they are different in the step 980, the routine advances to step 960 where registration of the verification result of the public key certificate of the certificate authority is determined. In step 980, comparison between the data received this time and the data registered in the table is performed. The data is determined as different data by the comparison in the following three cases; (1) the case where the public key received this time and the public key registered in the verification success certificate authority table 263 have different values, (2) the case where the public key received this time and the public key registered in the verification failure certificate authority table 264 have different values, and (3) the case where the signature of the public key certificate received this time and the signature of the public key certificate registered in the verification failure certificate authority table 264 have different values.

Figure 11:
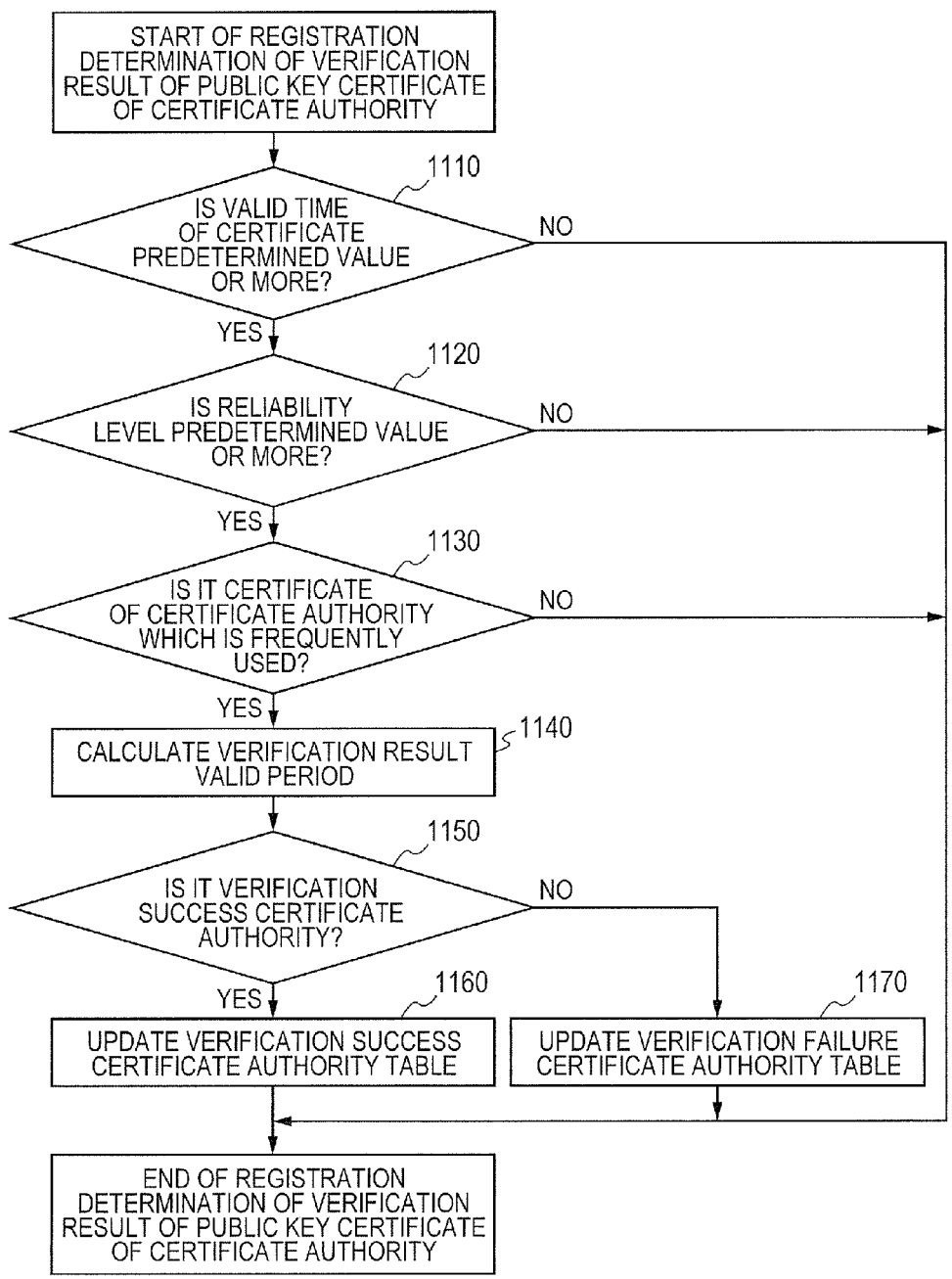
FIG. 11 is a diagram illustrating a flow when the in-vehicle device according to the embodiment processes a public key certificate of a device.

FIG. 11 illustrates the details of the above-described step 960. The diagram illustrates a process flow of registration determination of a verification result of a public key certificate of a certificate authority. Whether or not a verification result this time is registered in the verification success certificate authority table 263 (FIG. 5A) or the verification failure certificate authority table 264 (FIG. 5B) is determined on the basis of the valid period of the public key certificate, reliability level, and use frequency. In step 1110 illustrated in the diagram, present time is acquired by the time information acquisition processing unit 250. Whether the acquired present time is longer than the valid period of the public key certificate or not by predetermined time or longer is determined. Specifically, whether or not the remaining valid period of the public key certificate is longer than the predetermined time is determined. In step 1110 in FIG. 11, "is valid time of certificate predetermined value or more" is described. In the case where the valid period is shorter than the predetermined time as a result of the check, the registration determination of a verification result of the public key certificate, of the certificate authority is finished. On the contrary, in the case where it is determined that the valid period is longer than the predetermined time, step 1120 is executed. In the case where the reliability level of high-order certificate authority is determined that it is lower than a predetermined level in step 1120, the registration determination of the verification result of the public key certificate of the certificate authority is finished. The reliability level of each of the certificate authorities is registered in the setting information 265. For example, the reliability level is determined in advance for each of the certificate authorities, and a corresponding table between the certificate authorities and the reliability levels is provided in advance in the setting information 265. In such a manner, the reliability level of a high-order certificate authority can be determined. In the case where the reliability level is equal to or higher than the predetermined level, step 1130 is executed next. In FIG. 11, "is reliability level predetermined value or more?" is written in step 1120.

In step 1130, whether the use frequency of the public key certificate of a certificate authority is high or not is determined. For example, in the case where a certificate authority exists in each of areas and the public key certificate 271 of the in-vehicle device 102 is issued from a certificate authority existing in the residential area of the owner of the vehicle on which the in-vehicle device 102 is mounted, the present position is obtained from the driving information acquisition processing unit 240 (FIG. 2). In the case where the certificate authority exists in the present position (area), it is determined that the user frequency of the certificate authority is high. By storing a driving history in the driving information storing unit 280 (FIG. 2), the destination of this time is predicted from the driving history stored in the in-vehicle device 102. In the case of a certificate authority existing in an area on the way to the destination, it is determined that the use frequency of the certificate authority is high. The determination of the use frequency of a certificate authority is not limited to the above. It is also possible to cooperate with a not-illustrated automotive navigation system, obtain a destination from the system, and determine that the use, frequency of a certificate authority existing in an area on the way to the destination is high. Further, in the case where public key certificates are issued from certificate authorities which are different according to applications (certificate authorities are assigned by applications), an application mounted in the in-vehicle device 102 is determined. When the application is started, the use frequency of a public key certificate of a certificate authority assigned to the application may be determined high. The thresholds used for determinations in steps 1110 to 1130 (predetermined time and predetermined level are predetermined frequencies for determining that the user frequency is high) are registered in advance in the setting information 265. In FIG. 11, "is it certificate of certificate authority which is frequency used?" is written in step 1130.

With respect to a certificate authority whose use frequency is determined high in step 1130, the verification result effective time 532 and 544 is calculated from the use frequency in step 1140. A period in which a vehicle (in-vehicle device 102) exists in an area where a certificate authority whose use frequency is determined to, be high exists is calculated from the present driving information (position information, speed information, and travel direction information) obtained by the travel information acquisition processing unit 240, and the verification result valid time 532 and 544 may be determined so, as to exceed the calculated period. The method of calculating the verification result valid time 532 and 544 is not limited to the above. In the case where a public key certificate is issued from a certificate authority assigned to each of applications, the time may be calculated from average use time of the application. It is also possible to preliminarily register predetermined time information in the setting information 265, obtain new valid time by adding predetermined time information to the present time, and set the obtained valid time as the verification result valid time 532 and 544. In FIG. 11, "calculate verification result valid period" in step 1140.

In step 1150, a verification result of a public key certificate of this time is checked. That is, whether verification of a public key certificate succeeded or failed is determined. In the case where the verification of the public key certificate succeeds, step 1160 is executed. In step 1160, the verification success certificate authority table 263 is updated. On the other hand, in the case where the verification fails, step 1170 is executed. In step 1170, the verification fail re certificate authority table. 264 is updated. The updating in the steps 1160 and 1170 is performed in the case where a device ID is not registered in the verification success certificate authority table 263 and the verification failure certificate authority table 264, or in the case where a public key or a signature of a public key certificate, is different from a public key or a signature of a public key certificate which is already registered. Consequently, at the time of updating in the steps 1160 and 1170, a new certificate authority ID, a public key, the signature of as public key certificate, and verification result valid time are added to the verification success certificate authority table 263 and the verification failure certificate authority table 264. Since the verification success certificate authority table 263 and the verification failure certificate authority table 264 are configured by memories, the amount of information which can be registered is limited. In the case where the information amount reaches the maximum amount of information which can be registered in the table, whether or not there is information which is expired is checked based on the verification result valid time 532 or 544. In the case where there is the information, it is deleted, and a new verification result is registered (steps 1160 and 1170). In the case where there is no information which is expired, information whose valid time is shortest is deleted, and a new verification result is registered (steps 1160 and 1170). In FIG. 11, "is verification success certificate authority?" is written in 1150, "update verification success certificate authority table" is written in 1160, and "update verification failure certificate authority table" is written in 1170.

Figure 10:
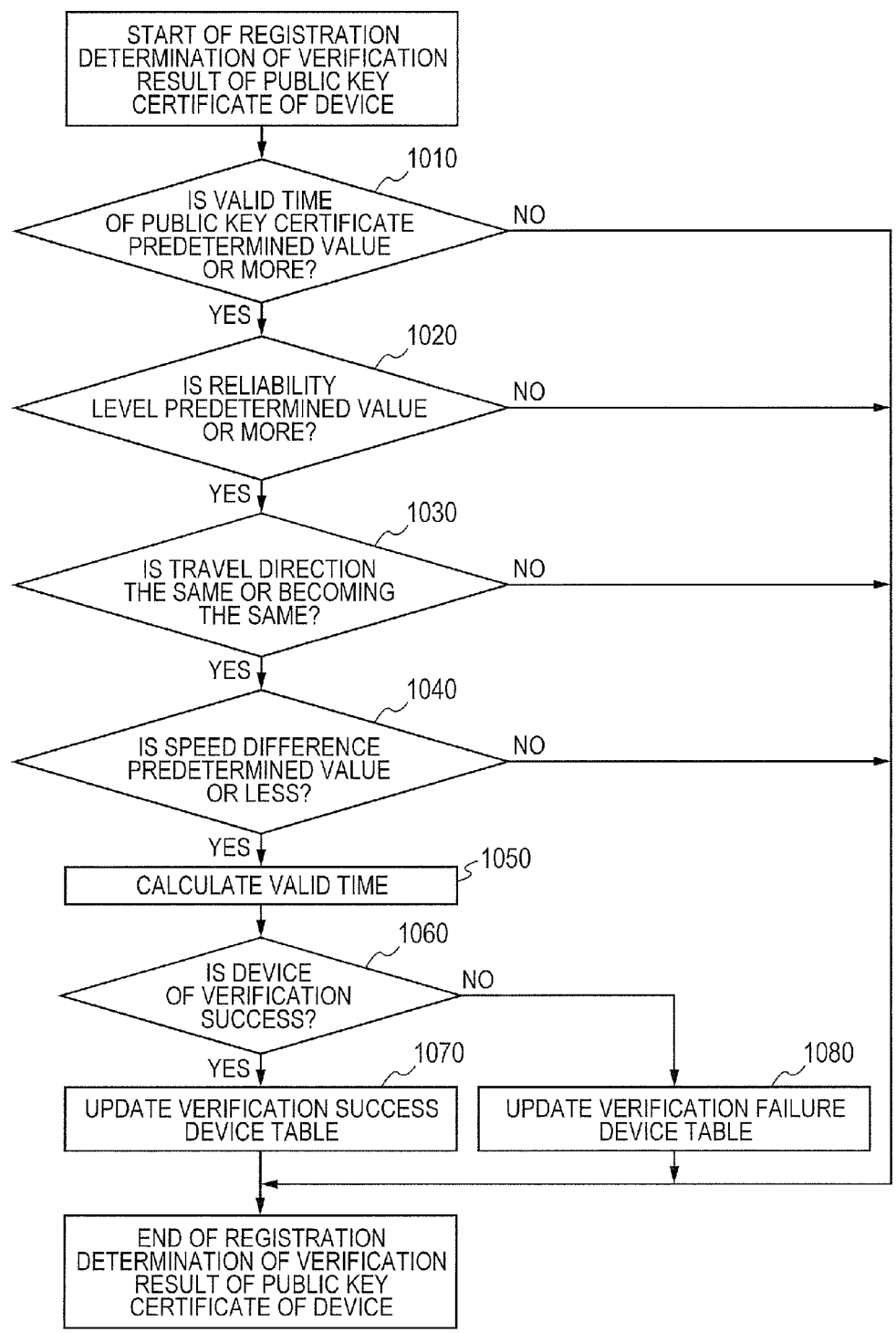
FIG. 10 is a diagram illustrating a flow when the in-vehicle device according to the embodiment processes a public key certificate of a certificate authority.

FIG. 10 illustrates the details of the step 910 in FIG. 9. Whether the verification result the public key, certificate of the device is registered in the verification success device table 261 or the verification failure device table 262 (hereinbelow, called "device table") is determined by the valid period of the public key certificate, reliability level, and use frequency. In step 1010 illustrated in FIG. 10, whether the valid period of the public key certificate is longer than predetermined time or not is determined. In the diagram, it is written as "is valid time of public key certificate predetermined value or more?" In the case where the valid period of the public key certificate is shorter than predetermined time, the process is finished without registering the result into the device table. In the it is written as "end of registration determination of verification result of public key certificate of device". On the other hand, in the case where the valid period is longer than predetermined time, step 1020 is executed next. In step 1020, the reliability level of the certificate authority issuing the public key certificate is determined. In the diagram, it is written as "is reliability level predetermined value or more?" In the case where the reliability level is lower than predetermined level, the process is finished. The reliability level of the certificate authority is registered in the setting information 265 in a manner similar to the above-described step 1120. In the case of a certificate authority whose reliability level is unknown, how to make determination is also registered in the setting information 265. For example, in the case where, the reliability level is unknown, it is set to perform a process while regarding that the reliability level is equal to or less than a predetermined level. In such a manner, the result is not registered in the verification success device table 263 nor the verification failure device table 264 and, in the case where a message is received from the same device ID, verification of the public key certificate is performed once more. By the above operation, the memory configuring the device table can be efficiently used.

In step 1030, the position information, speed information, and travel direction information of the in-vehicle device 102 (vehicle) is obtained from the driving information acquisition processing unit 240 of the vehicle on which the in-vehicle device 102 is mounted. In the diagram, it is written as "is travel direction the same or becoming the same?" From the received message M (FIG. 6), in the case where the travel directions are becoming apart from each other on the basis of the travel direction information 633 (FIG. 6) of the vehicle which transmitted the message M and the travel direction information of the vehicle on which the in-vehicle device 102 is mounted, it is determined not to register the result in the device table. Consequently, in this case, the process of finishing the registration determination of the verification result of the public key certificate of the device is performed.

On the other hand, in the case where it is determined in step 1030 that the travel directions are the same or becoming closer, step 1040 is performed next. In step 1040 speed difference is obtained from the speed information of the vehicle on which the in-vehicle device 102 is mounted and the speed information 632 (FIG. 6) of the received message M, and whether the speed difference is larger than a predetermined value or not is determined. In FIG. 10, it is written as "is speed, difference predetermined value or less?" In the case where the speed difference is larger than the predetermined value, the process of finishing the registration determination of the verification result of the public key certificate of the device is performed so as not to register the result in the device table. On the other hand, in the case where the speed difference is smaller than the predetermined value, step 1050 is executed. Consequently, since the verification result, of an in-vehicle device from which a message is received only once (for example, the in-vehicle device 102 which goes by at high speed) is not registered, the load on updating (addition) of the device table can be lessened.

In step 1050 (described as "calculate valid time" in FIG. 10), the verification result valid time is calculated on the basis of the position information of the vehicle on which the in-vehicle device 102 is mounted, the position information 631 of the received message (FIG. 6), and information (travel direction information and speed information) in steps 1030 and 1040.

With reference to FIG. 11, updating (addition) on the verification success certificate authority table 263 and the verification failure certificate authority table 264 (called certificate authority table) has been described above. As understood from the description, in the updating (addition)

on a certificate authority table, the use frequency is also regarded as information used to determine whether updating (addition) is performed or not. However, for updating (addition) on the verification success device table 261 and the verification failure device table 262, not the use frequency but the travel direction information and the speed information is used to determine whether updating (addition) is performed or not. Consequently, depending on whether the vehicle (roadside device) approaches or goes away, updating (addition) can be performed on the device table. For updating (addition) of the device table, not the travel direction information and the speed information but, for example, acceleration and destination information may be used. The updating (addition) may be determined on the basis of a proper combination of the four kinds of information. The travel direction information and the speed information can be regarded as one of criteria of the use frequency.

In step 1060 in FIG. 10, a verification result of a public key certificate is checked. In the diagram, it is written as "is device of verification success?" Specifically, whether verification of a public key certificate of a device succeeded or not is determined. In the case of "Yes", step 1070 is executed. In the case of "No", step 1080 is executed. In step 1070, updating (addition) is performed on the verification success device table 261. On the other hand, in the case of failure, updating (addition) is performed on the verification failure device table 262 in step 1080. In steps 1070 and 1080, like in the steps 1160 and 1170, when information of a maximum value is registered in a device table to which information is added, whether there is information which is expired or not is determined from the verification result valid time 412 or the verification result valid time 524. In the case of "Yes", the information is deleted, and a new verification result is registered. In the case where there is no information which is expired, information whose valid time is shortest is deleted, and a new verification result is registered. In FIG. 10, "update verification success device table" is written in step 1070, and "update verification failure device table" is written in step 1080.

Although an example of storing verification result valid time in a device table has been described in the foregoing embodiment, a valid area may be used in place of the verification result valid time. For example, a valid area corresponding to a device ID is provided in a device table. Depending on whether a device ID is deviated from the valid area or not, updating (addition) on the device table may be determined. Obviously, both of the verification result valid time and the valid area may be stored in a table.

Although a check of evocation of a certificate has not be written in the foregoing embodiment, also in the case where revocation of a certificate is recognized, it can be regarded as a failure in the verification of a public key certificate. Therefore it is to be understood that a failure in verification of a public key certificate includes a case where the certificate is expired, a case where verification of a signature with a public key of a certificate authority fails, and a case where the certificate is revoked.

Although the present invention achieved by the inventors herein has been described concretely above on the basis of the embodiment, obviously, the invention is not limited to the embodiment but can be variously changed without departing from the gist.

What is claimed is:

1. An apparatus comprising:
   a processing unit configured to receive messages from one or more senders, each message including:
      a public key certificate;
      a device ID specifying a respective sender; and
      data to be used when verification of the public key certificate succeeds; and
   first and second holding circuits of a verification memory,
   the first holding circuit being configured to store a device ID and a corresponding first valid time together with a public key and signature of a previously received message whose public key certificate has failed verification,
   the second holding circuit being configured to store a device ID and a corresponding second valid time together with a public key of another previously received message whose public key certificate has been successfully verified,
   wherein the first and second valid times indicate a limit of time for use of the device ID stored in the first and second holding circuits, respectively,
   wherein the processing unit is configured to, when a message is received at a first time:
      check if the device ID is stored in the second holding circuit and if the first time is before the second valid time,
      if the check indicates that the device ID is stored in the second holding circuit and that the first time is before the second valid time, execute a process using data in the received message without performing a separate verification process on the public key certificate of the received message,
      if the check indicates that the device ID is not stored in the second holding circuit or that the first time is after the second valid time, perform a second check to determine if the device ID is stored in the first holding circuit,
      if the second check indicates that the device ID is stored in the first holding circuit and that the first time is before the first valid time, perform a third check to compare the public key and signature stored with the device ID in the first holding circuit to the public key and signature in the public key certificate of the received message,
      if the third check indicates that the public key and signature stored with the device ID in the first holding circuit are the same as the public key and signature in the public key certificate of the received message, indicating the public key certificate of the received message as having failed verification without performing a separate verification process on the public key certificate, and
      if the third check indicates that either of the public key and signature stored with the device ID in the first holding circuit are different from the public key and signature in the public key certificate of the received message, performing the separate verification process on the public key certificate of the received message and on an associated certificate authority for the public key certificate,
   wherein the processing unit calculates the first valid time and/or the second valid time at a time of storage in the verification memory based on position and/or velocity of the apparatus,
   wherein each message has a public key certificate of a certificate authority, including a certificate authority ID,
   the apparatus further comprising third and fourth holding circuits of the verification memory,
   the third holding circuit being configured to store a certificate authority ID of a previously received message whose public key certificate of the certificate authority has failed verification,
the fourth holding circuit being configured to store a certificate authority ID of a previously received message whose public key certificate of the certificate authority has been successfully verified, and
wherein the processing unit is further configured to:
perform a fourth check to determine whether or not a certificate authority ID of the received message matches a certificate authority ID stored in the fourth holding circuit,
if the fourth check indicates that the certificate authority ID of the received message matches a certificate authority ID stored in the fourth holding circuit, verify the public key certificate of the received message without performing the separate verification process,
if the fourth check indicates that the certificate authority ID of the received message does not match a certificate authority ID stored in the fourth holding circuit, perform a fifth check to determine whether or not the certificate authority ID included in the received message matches a certificate authority ID stored in the third holding circuit, and
if the fifth check indicates that the certificate authority ID of the received message matches a certificate authority ID stored in the third holding circuit, indicate the public key certificate of the received message as having failed verification without performing the separate verification process.

2. The apparatus according to claim 1, wherein the processing unit is further configured to:
store the device ID from the received message in the first holding circuit when the separate verification process does not succeed in verification, and
store the device ID in the second holding circuit when the separate verification process succeeds in verification.

3. The apparatus according to claim 1,
wherein the processing unit is further configured to:
when the separate verification process performed on the public key certificate included in the received message succeeds, store the device ID in the second holding circuit, and
when the separate verification process performed on the public key certificate included in the received message fails, store the device ID in the first holding circuit.

4. The apparatus according to claim 3,
wherein the processing unit is further configured to:
when the certificate authority ID included in a received message does not match any certificate authority ID stored in the third and fourth holding circuits, perform the separate verification process on the public key certificate of the certificate authority included in the received message,
if the separate verification process succeeds, store the certificate authority ID in the fourth holding circuit, and,
if the separate verification process fails, store the certificate authority ID in the third holding circuit.

5. An in-vehicle communication system authenticating a message with a public key, comprising:
a communication control processing unit; and
a memory,
wherein the communication control processing unit is configured to perform a first check to see whether a verification result of a public key certificate of a message is registered in a memory or not,
wherein each verification result registered in memory is stored with a corresponding valid time value that indicates a time limit for use of the registered verification result,
wherein if the first check indicates that the result is registered in the memory as verification success and a reception time of the message is before the corresponding valid time value, a separate verification process for verifying the public key certificate is omitted and a signature of the message is verified,
if the first check indicates that the result is registered as verification failure,
the processing unit is configured to perform a second check comparing stored values of a public key and a signature of a public key certificate with respective values of a public key and a signature of the public key certificate of the received message,
if the second check indicates that the stored values are the same as the values of the public key and signature of the received message, the message is processed as a failure in verification of the signature in the message without performing the separate verification process,
if the second check indicates that the stored values and the values of the public key and signature of the received message are different, the processing unit is configured to perform the separate verification process on the public key certificate in the received message,
if the separate verification process successfully verifies the received public key certificate, the signature of the received message is also verified by the processing unit,
if the separate verification process fails to verify the received public key certificate, the signature of the received message also fails verification by the processing unit,
wherein the processing unit is configured to store the public key certificate of the message that is not already registered in the memory based on a result of the separate verification process,
wherein the public key certificate of each message is of a certificate authority, including a certificate authority ID,
wherein the memory is configured to store a certificate authority ID of a previously received message whose public key certificate of the certificate authority has failed verification,
wherein the memory is further configured to store a certificate authority ID of a previously received message whose public key certificate of the certificate authority has been successfully verified, and
wherein the processing unit is further configured to:
perform a fourth check to determine whether or not a certificate authority ID of the received message matches a certificate authority ID registered in the memory as a verification success,
if the fourth check indicates that the certificate authority ID of the received message matches a certificate authority ID registered in the memory as a verification success, verify the public key certificate of the received message without performing the separate verification process,
if the fourth check indicates that the certificate authority ID of the received message does not match a certificate authority ID registered in the memory as a verification success, perform a fifth check to determine whether or not the certificate authority ID included in the received message matches a certificate authority ID registered in the memory as a verification failure, and if the fifth check indicates that the certificate authority ID of the received message matches a certificate authority ID registered in the memory as a verification failure, indicating the public key certificate of the received message as having failed verification without performing the separate verification process.

6. The in-vehicle communication system according to claim 5, wherein the message is sent from a vehicle or a roadside device.

7. The in-vehicle communication system according to claim 6, wherein whether or not a result of verification of a public key certificate is registered into a memory is determined using at least one of:

travel information of a vehicle sending a message;

setting information of a roadside device sending a message;

travel information of a vehicle receiving a message;

information related to expiration date of a public key certificate of a vehicle or a roadside device transmitting a message; and information related to reliability level of a public key certificate.

8. The in-vehicle communication system according to claim 5, wherein the valid time values are calculated by the processing unit at a time of storage in the memory based on position and/or velocity of the communication system.

* * * * *